United States Patent [19]

Eizen

[11] Patent Number: 5,331,307
[45] Date of Patent: Jul. 19, 1994

[54] VEHICLE ANTI-THEFT SYSTEM INCLUDING A GEAR SHIFT LOCK AND AN ANTI-THEFT DEVICE OPERATED THEREBY

[75] Inventor: Noach Eizen, Rishon Lezion, Israel

[73] Assignee: Mul-T-Lock, Ltd., Israel

[21] Appl. No.: 787,902

[22] Filed: Nov. 5, 1991

[30] Foreign Application Priority Data

Nov. 6, 1990 [IL] Israel .................. 96262

[51] Int. Cl.$^5$ .............................. B60R 25/00
[52] U.S. Cl. .................... 340/426; 307/10.2
[58] Field of Search ............ 340/425.5, 426, 430, 340/438, 456, 693; 70/245, 246, 247, 248, DIG. 49, DIG. 59, 439, 432; 307/10.1, 10.2

[56] References Cited

U.S. PATENT DOCUMENTS

| | | | |
|---|---|---|---|
| 1,132,128 | 3/1915 | Smith | 390/426 |
| 1,280,896 | 10/1918 | Stroeh et al. | 70/206 |
| 1,453,004 | 4/1923 | Collion | 70/203 |
| 1,559,189 | 10/1925 | Shaw | 70/201 |
| 1,615,539 | 1/1927 | Evans | 70/251 |
| 1,815,417 | 7/1931 | Miller | 70/204 |
| 1,853,036 | 4/1932 | Briggs | 70/248 |
| 2,293,197 | 8/1942 | Dorr | 70/202 |
| 2,892,181 | 6/1959 | Benson | 340/693 |
| 3,401,544 | 9/1968 | Fraser | 70/248 |
| 3,879,721 | 4/1975 | Yereance | 340/427 |
| 4,679,417 | 7/1987 | Van Cise, Jr. | 70/247 |
| 4,693,099 | 9/1987 | Cykman | 70/247 |
| 4,747,279 | 5/1988 | Solow | 70/238 |

FOREIGN PATENT DOCUMENTS

| | | |
|---|---|---|
| 3702479 | 6/1987 | Fed. Rep. of Germany . |
| 2525540 | 10/1983 | France . |
| 69748/2 | 7/1983 | Israel . |
| 2023076 | 12/1979 | United Kingdom . |

*Primary Examiner*—Hezron E. Williams
*Assistant Examiner*—Christine K. Oda
*Attorney, Agent, or Firm*—Nixon & Vanderhye

[57] ABSTRACT

A vehicle anti-theft device comprising a gear shift lock and an ancillary vehicle anti-theft device which is operated automatically by operation of the gear shift lock.

12 Claims, 7 Drawing Sheets

VEHICLE ANTI-THEFT SYSTEM INCLUDING A GEAR SHIFT LOCK AND AN ANTI-THEFT DEVICE OPERATED THEREBY

FIELD OF THE INVENTION

The present invention relates generally to anti-theft devices for motor vehicles.

BACKGROUND OF THE INVENTION

Various types of anti-theft devices are known for use with motor vehicles. These include, for example, intrusion alarms, ignition locks, ignition interlocks, steering wheel and brake locks and the like. A particularly successful anti-theft device is described and claimed in U.S. Pat. No. 4,693,099 dated Sep. 15, 1987, and is marketed by the present assignees.

It is known for a vehicle to be protected by multiple anti-theft devices. The use of multiple devices is generally inconvenient due to the multiple operations that must be undertaken both to activate and to deactivate the anti-theft devices each time the operator leaves, enters or operates the vehicle.

There are known in the patent literature various gear lever locking devices. U.S. Pat. Nos. 1,615,539 and 1,853,036 describe gear shift lever locks which are integrally formed with a gear shift lever handle and which is operative for permitting the vehicle ignition to be turned off only when the gear shift lever is locked.

U.S. Pat. Nos. 1,280,896; 1,453,004; 1,815,417; and 2,293,197 describe locking devices for gear shift levers which are integrally formed with or attached to the gear shift mechanism. U.S. Pat. No. 4,679,417 describes a transmission selector assembly having a built in selector assembly including a key operated lock which is angled upwardly.

SUMMARY OF THE INVENTION

The present invention seeks to provide an improved retrofittable, generally universal, multi-functional vehicle anti-theft device which is quick and convenient to use.

There is thus provided in accordance with a preferred embodiment of the present invention a vehicle anti-theft device comprising a gear shift lock and an ancillary vehicle anti-theft device which is operated automatically by operation of the gear shift lock.

The ancillary vehicle anti-theft device may comprise one or more of the following: audio or visual alarm, ignition or vehicle operation interlocking means, intrusion or vehicle motion detection apparatus, any other suitable vehicle anti-theft device.

In accordance with one embodiment of the invention, the ancillary vehicle anti-theft device may be actuated by locking of the gear shift lock with or without a suitable delay and may be deactuated by unlocking of the gear shift lock.

Additionally in accordance with a preferred embodiment of the invention, electronic circuitry forming part of the ancillary vehicle anti-theft device may be located within the housing assembly. The electronic circuitry may communicate with other elements of the ancillary vehicle anti-theft device, such as sensors, interlocks and alarm output devices via electrical conductors or by wireless communication apparatus, such as infrared communication apparatus.

There is also provided in accordance with a preferred embodiment of the present invention a gear shift lock for a vehicle comprising a housing assembly retrofittably fixable to a vehicle chassis, a lock assembly mounted in the housing assembly and arranged for operative engagement with a lock yoke, the lock assembly being arranged to define a cylinder face for insertion of a key which cylinder face is arranged to lie facing upwardly in a plane angled between the horizontal and vertical directions with respect to the vehicle chassis, and preferably at about 45 degrees with respect thereto.

In accordance with an embodiment of the present invention the housing is fixed to the chassis by means of shear nuts. Additionally in accordance with a preferred embodiment of the invention, the housing includes a reinforced apertured portion through which legs of the yoke extend when the yoke is in locking engagement with the lock assembly.

Additionally in accordance with a preferred embodiment of the invention, there is also provided a lock assembly cover which also defines at least one socket for holding the yoke, when it is not in locking engagement with the locking assembly in at least one storage orientation.

Further in accordance with a preferred embodiment of the invention, the yoke is provided with a thermal insulative cover. Preferably the cover is arranged for snap on engagement with the yoke.

Additionally in accordance with a preferred embodiment of the invention, there is provided a vehicle including a gear shift lock constructed and operative as set forth hereinabove. Further in accordance with a preferred embodiment of the invention there is provided a vehicle including a gear shift lock and an ancillary vehicle anti-theft device which is operated automatically by operation of the gear shift lock.

Further in accordance with a preferred embodiment of the invention, there is provided a method for preventing vehicle theft including the steps of providing a gear shift lock and an ancillary vehicle theft prevention device in operative engagement with a vehicle and locking the gear shift lock, thereby automatically actuating the ancillary vehicle theft prevention device.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
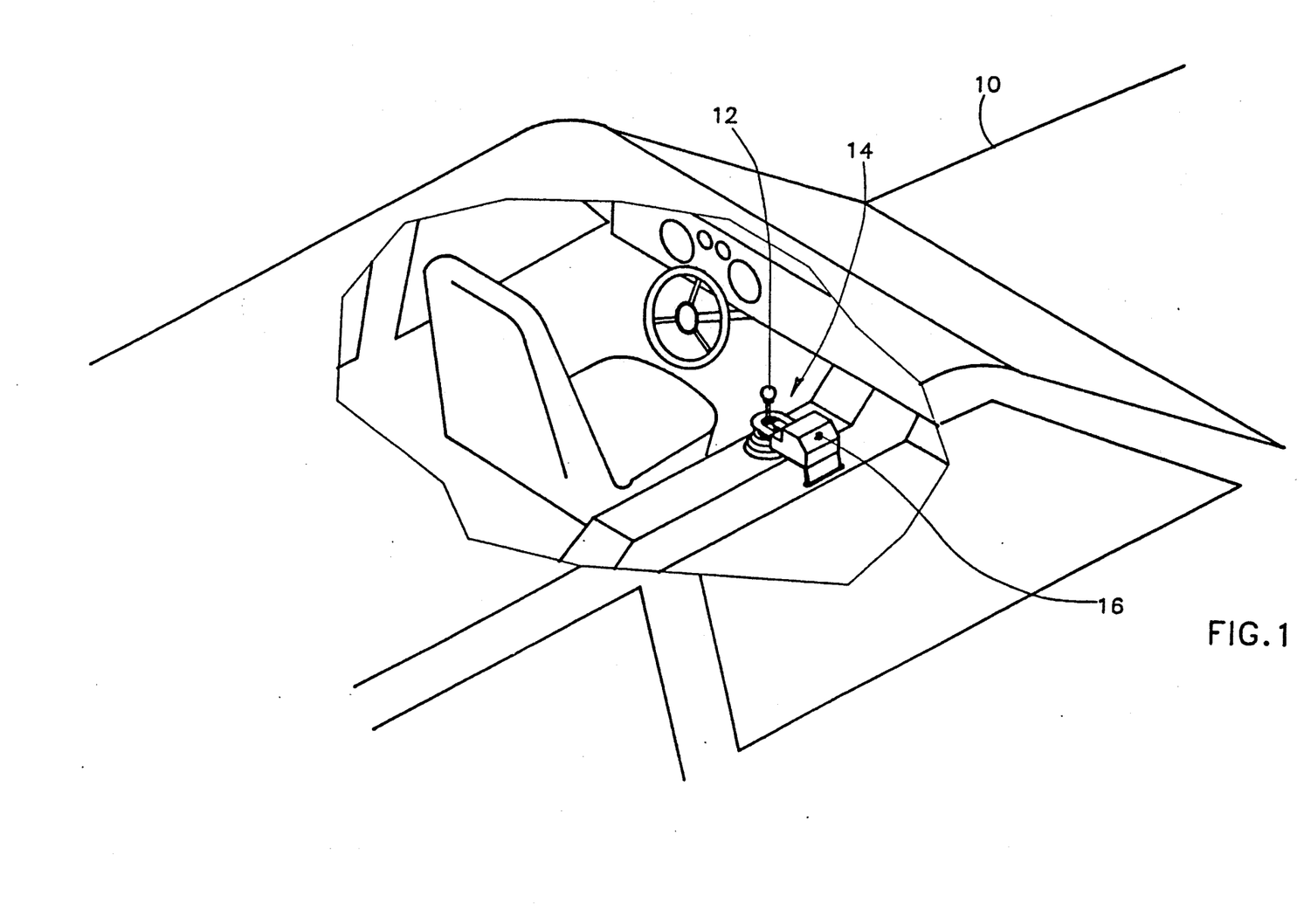
FIG. 1 is a pictorial illustration of a vehicle including anti-theft apparatus constructed and operative in accordance with a preferred embodiment of the present invention.

Reference is now made to FIG. 1, which illustrates a motor vehicle 10 having a gear shift lever 12, preferably of the floor mounted type. In accordance with a preferred embodiment of the present invention there is provided a retrofittable gear shift lock, indicated generally by reference numeral 14, which is arranged for selectable locking engagement with the gear shift lever 12, but which is not normally mounted thereon or attached thereto.

One principal feature of the present invention resides in the upwards orientation of key entry surface or face 16 of the gear shift lock 14, which is preferably not vertical, as distinguished from the prior art. Another principal feature of the present invention is that the gear shift lock 14 is integrated with an ancillary vehicle anti-theft device, such as, for example, one or more of the following: audio or visual alarm, ignition or vehicle operation interlocking means, intrusion or vehicle motion detection apparatus, any other suitable vehicle anti-theft device. Preferably all or a significant part of the control electronics for the ancillary anti-theft device is located within the housing of the gear lock.

Another principal feature of the invention resides in its universal, retrofittable construction, which enables it to be installed after completion of manufacture in most automobile models and does not require attachment to the gear mechanism itself.

Reference is now made to FIGS. 2-7 which illustrate the construction and mounting of the gear shift lock 14 on a vehicle. As seen particularly in FIG. 2, the gear shift lock 14 includes a housing assembly comprising a mounting bracket 20, which is typically bolted onto the vehicle chassis using bolts 22 and shear nuts 24. A lock surrounding housing element 26 is mounted onto an upstanding apertured portion 27 of mounting bracket 20 by means of bolts 28, which also serve to attach a reinforcing cover member 30 over portion 27.

Figure 2:
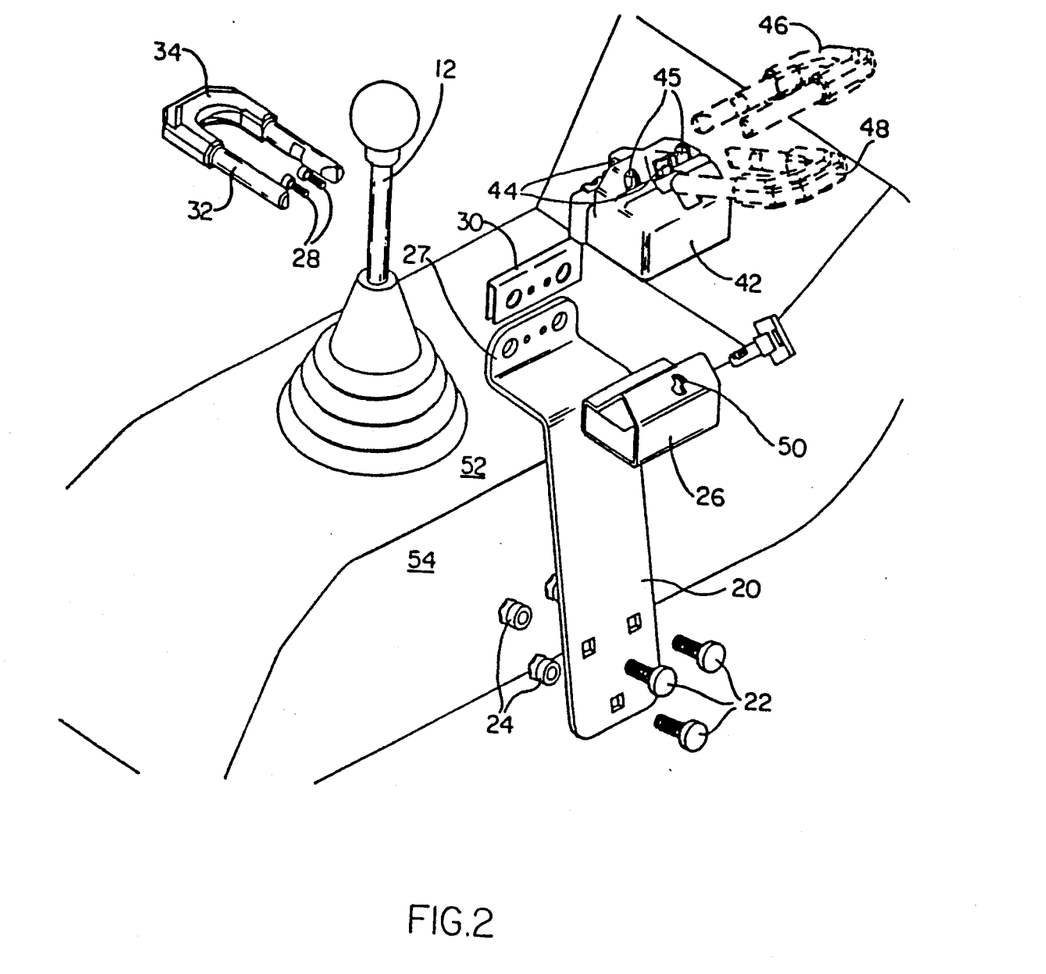
FIG. 2 is a partial exploded view illustration of part of the anti-theft apparatus of the present invention.

A yoke 32 preferably having a snap on plastic cover 34 is arranged to removably extend through the apertures in apertured portion 27 and reinforcing cover member 30 and to be locked in a gear shift lever engaging position by a lock 40, located within housing element 26.

A cover member 42, typically formed of plastic, is disposed over the housing element 26 and is configured to provide a pair of sockets 44 and 45 for receiving yoke 32 in either of two mutually perpendicular orientations, such as those indicated by reference numerals 46 and 48, when the yoke 32 is not in a gear shift lever engagement orientation. It is noted that the angular orientation of the key receiving cylinder opening 50 of lock enclosure 26 is upward and between the horizontal with respect to the vehicle chassis, here represented by plane 52 and the vertical with respect to the vehicle chassis, here represented by plane 54, and is preferably arranged to lie at 45 degrees therebetween.

Figure 3:
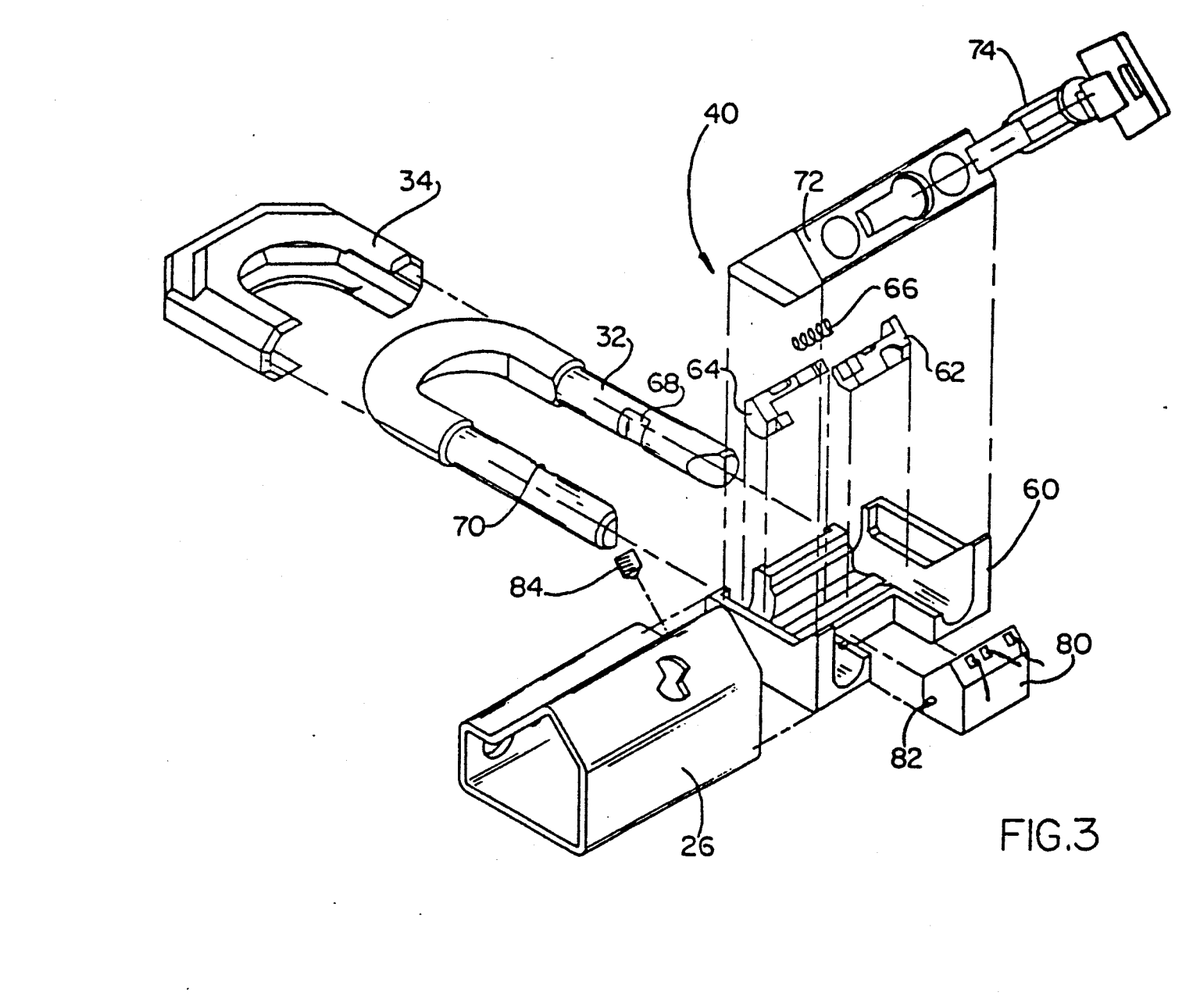
FIG. 3 is an exploded view illustration of part of anti-theft apparatus of the present invention.
Figure 4:
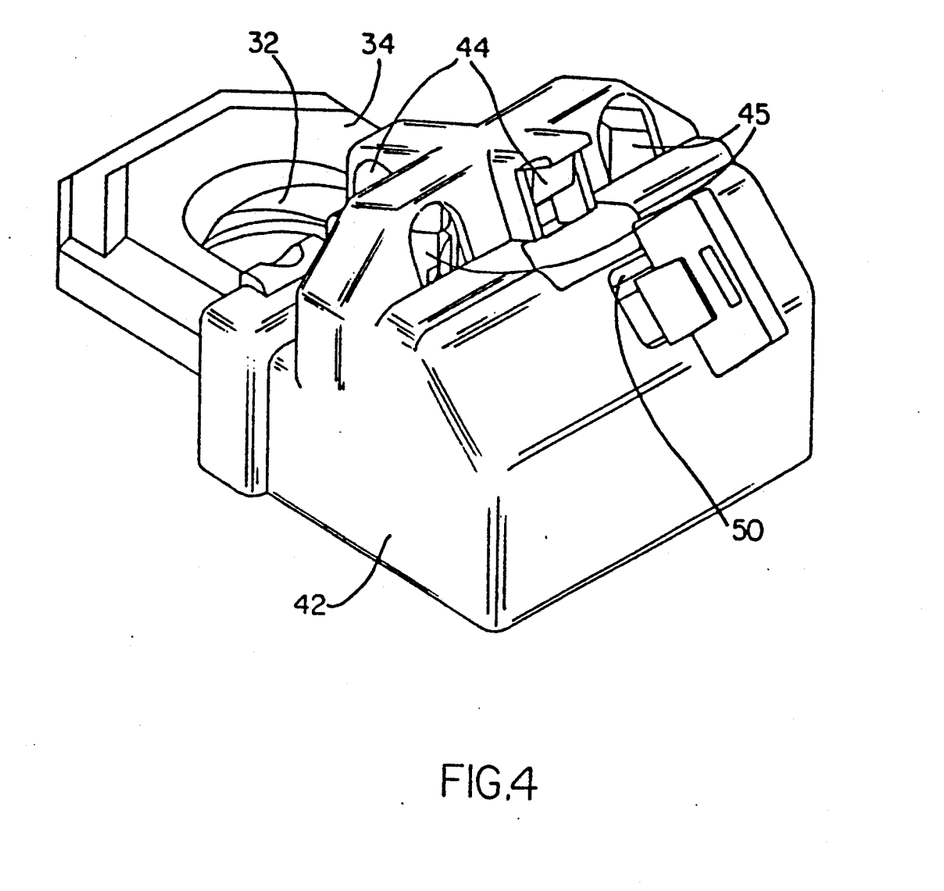
FIG. 4 is a pictorial illustration of part of the anti-theft apparatus of FIG. 2.
Figure 5A:
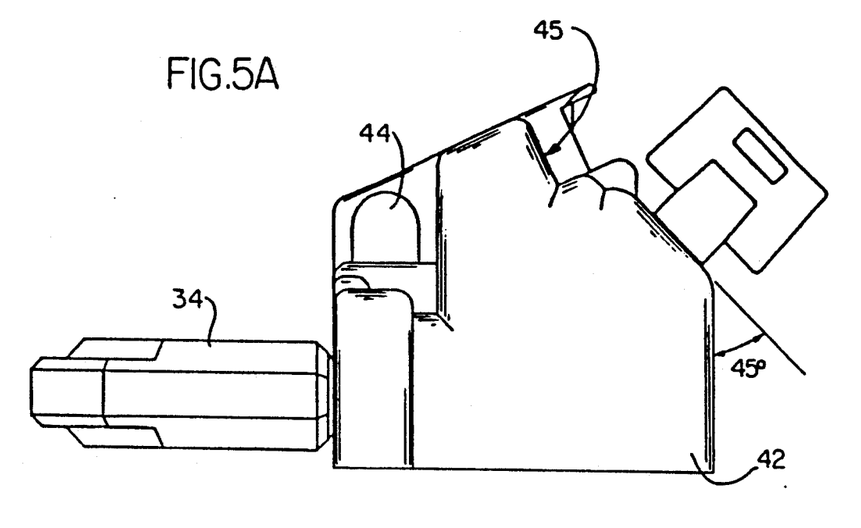
FIGS. 5A and 5B are respective side view and top view illustrations of the apparatus of FIG. 3.
Figure 5B:
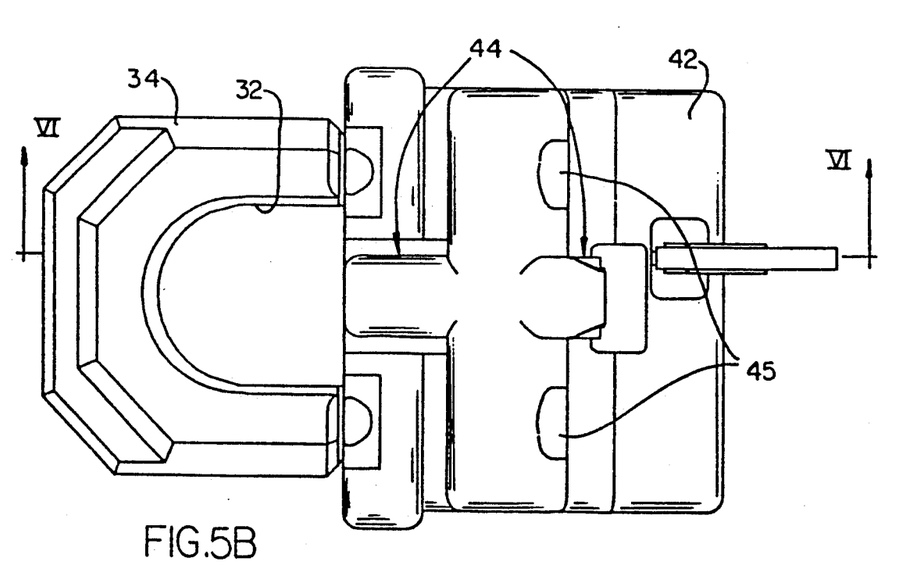
Figure 6:
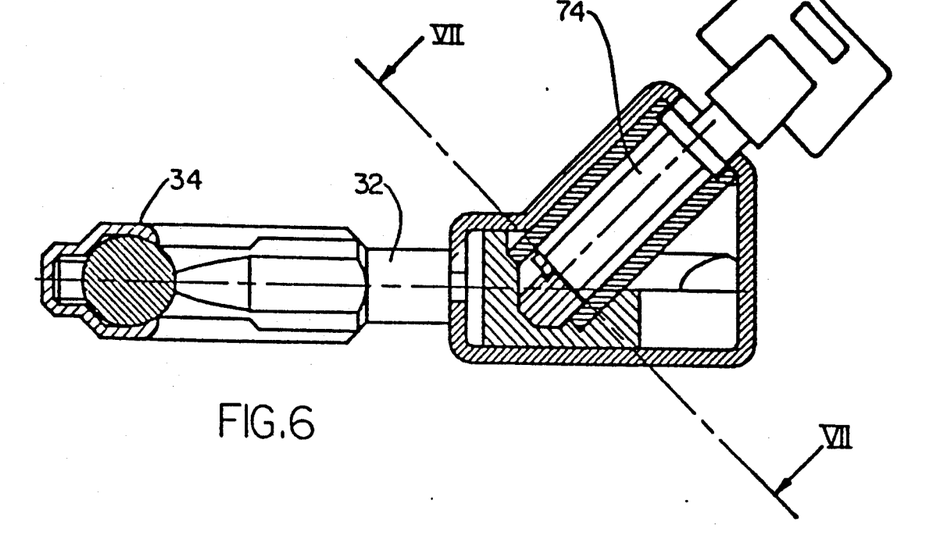
FIG. 6 is a side sectional view illustration taken along the lines VI—VI of FIG. 5B.
Figure 7:
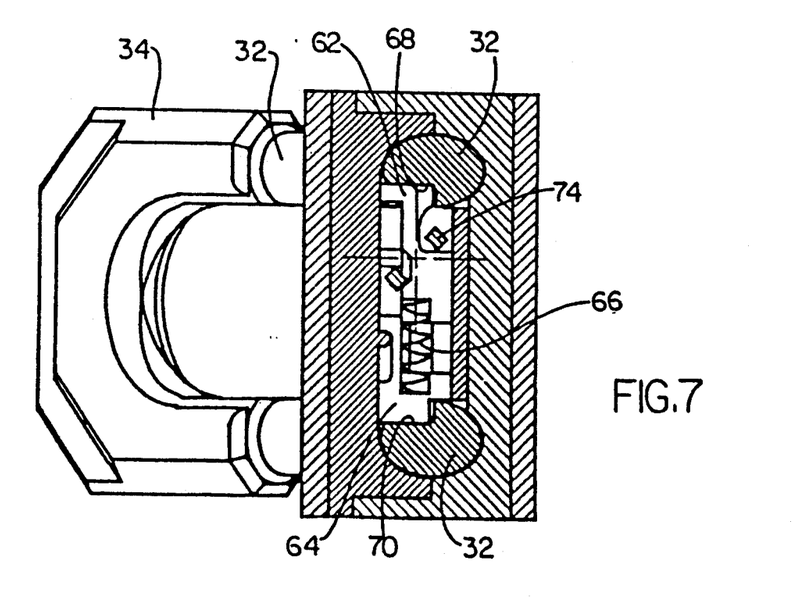
FIG. 7 is a sectional view illustration taken along the lines VII—VII of FIG. 6.

Referring now particularly to FIG. 3, it is seen that disposed within the housing element 26 there is provided lock 40, which includes a base member 60, a pair of angled bolts 62 and 64 which are slidably mounted with respect to base member 60 and a spring 66, which is operative to urge the bolts away from each other and into engagement with corresponding recesses 68 and 70 of yoke 32.

Cooperating with base member 60 is a cylinder mounting member 72, which is arranged for mounting a cylinder 74 preferably at a generally 45 degree angle with respect to the bottom surface of member 60 and the plane of yoke 32 when in locking engagement.

Electronic circuitry 80, forming part or substantially all of an ancillary anti-theft device is also disposed within housing element 26. A yoke locking orientation sensor 82 is preferably associated with circuitry 80 for sensing when the yoke 32 is in a locked orientation with respect to lock 40. Sensor 82 may be any suitable type of sensor, such as a microswitch, capacitive, magnetic or optical sensor.

A set screw assembly 84 is preferably provided to maintain internal parts 60, 62, 64, 66, 72, 74, 80 and 82 in a generally fixed orientation within the housing 26. Unscrewing the set screw 84 allows easy access to the internal parts of the apparatus, such as when it is necessary to change the cylinder.

Figure 8:
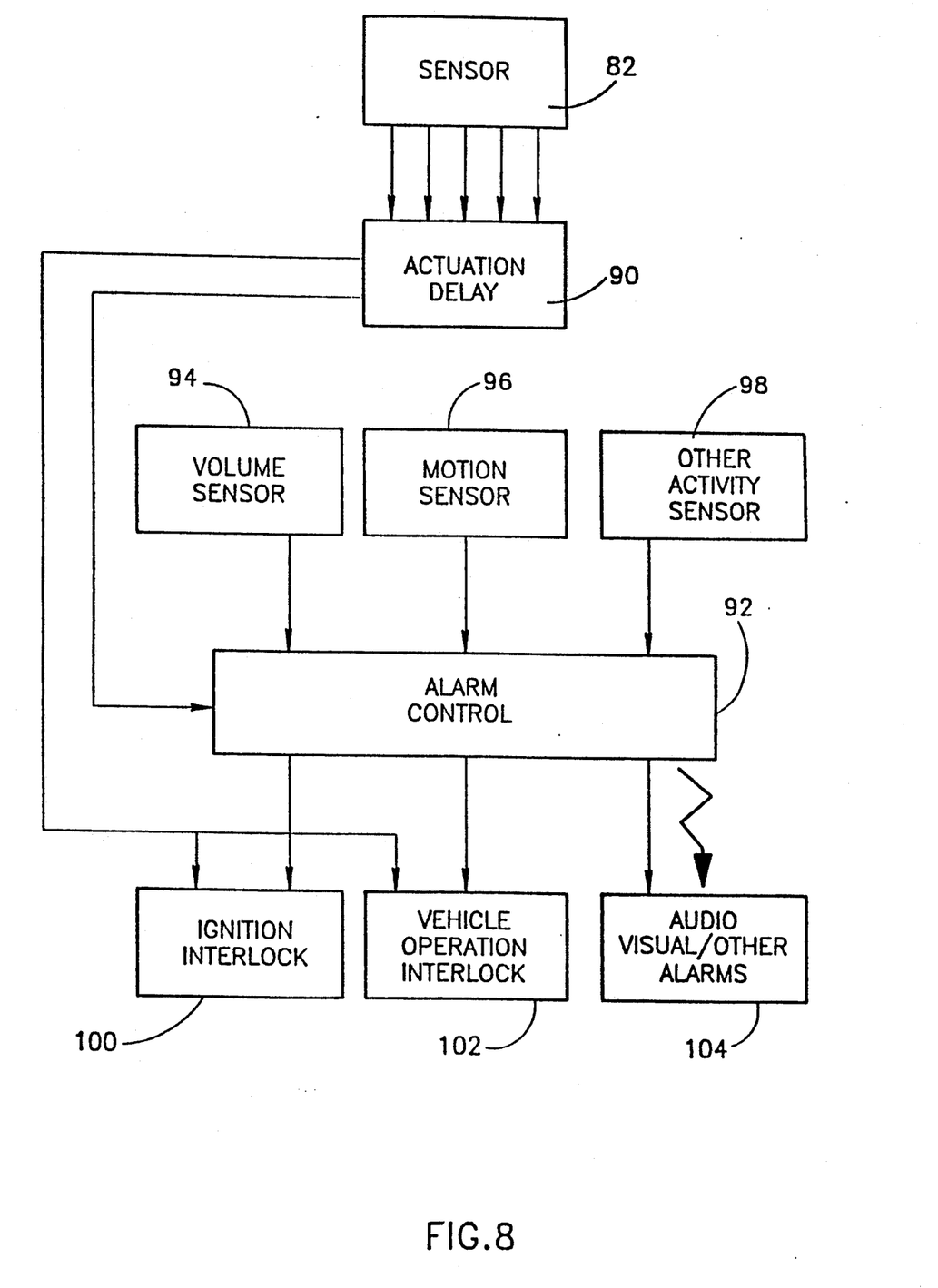
FIG. 8 is a block diagram illustration of the gear lock and ancillary anti-theft device system provided in accordance with the present invention.

Reference is now made to FIG. 8, which is a block diagram illustration of an ancillary alarm system useful in the present invention. Sensor 82 provides an output indicating the LOCKED/UNLOCKED status of the gear lever lock 14 via actuation delay circuitry 90 to an alarm control circuit 92. The alarm control circuit may be any suitable alarm control circuit, which is preferably of a sufficiently small size as to be locatable within the available space in housing element 26. It may be embodied in a suitable integrated circuit as appropriate and should include standard functions of alarm controls commercially available from Visonic Ltd. of Israel. The alarm control receives alarm inputs from various sensors such as a volume sensor 94, for example, a passive infrared sensor manufactured by Visonic Ltd. of Israel, a motion sensor 96, for example, a conductive ball sensor, commercially available from Nahshol Electronics Ltd. of Israel and any other suitable sensor 98, such as a sensor which senses the attempted starting of a vehicle, the breaking of glass or any other relevant parameters.

The alarm control may include false alarm prevention features as appropriate and alarm indication output logic circuitry of conventional design and operation. The alarm control may operate a number of output devices, which may additionally or alternatively receive control outputs directly from sensor 82 or via actuation delay 90. The output devices may include one and more of the following: an ignition interlock 100, which prevents starting of the vehicle when the gear lever lock is locked, vehicle operation interlock apparatus 102 which prevents operation of the vehicle when the gear lever lock is locked and which may include a valve on the fuel line or a switch on the high voltage power supply to the spark plugs.

Additionally, the alarm control apparatus may operate audio and/or visual alarms 104, such as lights, sirens, automatic dial attempted theft reporting apparatus and the like, to provide an output indication of attempted theft.

Suitable wiring may be provided to enable communication between the various elements of the circuitry of FIG. 8. Alternatively one or more communication links may employ wireless communications such as infrared or radio communications.

It will be appreciated by persons skilled in the art that the present invention is not limited by what has been particularly shown and described hereinabove. Rather the scope of the present invention is defined only by the claims which follow:

I claim:

1. A vehicle anti-theft system comprising:
   a gear shift lock having a lock housing;
   a lock yoke for selectable locking engagement with the gear shift lock;
   a yoke locking orientation sensor for sensing when said lock yoke is in locking engagement with said gear shift lock; and
   an ancillary vehicle anti-theft device which is actuated by positioning of said lock yoke in locking engagement with said gear shift lock and is deactuated by removal of the yoke from locking engagement with the gear shift lock, said ancillary vehicle anti-theft device including electronic circuitry for controlling the operation of the anti-theft device located inside said lock housing.

2. The system according to claim 1 and wherein said ancillary vehicle anti-theft device comprises at least one of the following devices: audio alarm, visual alarm, vehicle operation prevention means, intrusion detection apparatus and vehicle motion detection apparatus.

3. The system according to claim 1 and wherein said electronic circuitry communicates with the ancillary vehicle anti-theft device by means of wireless communication means.

4. The system according to claim 1 and wherein said lock housing includes having a reinforced apertured portion through which legs of the yoke extend when the yoke is in locking engagement with the gear shift lock.

5. The system according to claim 1 and wherein said ancillary vehicle anti-theft device is actuated following a predetermined delay.

6. A vehicle including
   a gear shift lock having a lock housing;
   a lock yoke for selectable locking engagement with the gear shift lock;
   a yoke locking orientation sensor for sensing when said lock yoke is in locking engagement with said gear shift lock; and
   an ancillary vehicle anti-theft device which is actuated by positioning of said lock yoke in locking engagement with said gear shift lock and is deactuated by removal of the yoke from locking engagement with the gear shift lock, said ancillary vehicle anti-theft device including electronic circuitry for controlling the operation of the anti-theft device located inside said lock housing.

7. The vehicle according to claim 6 and wherein said ancillary vehicle anti-theft device comprises at least one of the following devices: audio alarm, visual alarm, ignition operation interlocking means, vehicle operation interlocking means, intrusion detection apparatus and vehicle motion detection apparatus.

8. The vehicle according to claim 6 and wherein said electronic circuitry communicates with the ancillary vehicle anti-theft device by means of wireless communication means.

9. The vehicle according to claim 6 and wherein said lock housing defines a surface lying upwardly in a plane angled between the horizontal and vertical directions with respect to the vehicle and said surface defines a key receiving opening.

10. A method for preventing vehicle theft including the steps of providing a gear shift lock having a lock housing;
    a lock yoke for selectable locking engagement with the gear shift lock;
    a yoke locking orientation sensor for sensing when said lock yoke is in locking engagement with said gear shift lock; and
    an ancillary vehicle anti-theft device which is actuated by positioning of said lock yoke in locking engagement with said gear shift lock and is deactuated by removal of the yoke from locking engagement with the gear shift lock, said ancillary vehicle anti-theft device including electronic circuitry for controlling the operation of the anti-theft device located inside said lock housing; and
    positioning the lock yoke in locking engagement with said gear shift lock, thereby actuating the ancillary vehicle anti-theft device.

11. A vehicle anti-theft system comprising:
    a gear shift lock having a lock housing;
    a lock yoke for selectable locking engagement with the gear shift lock by insertion thereof into the gear shift lock without requiring key operation;
    a yoke locking orientation sensor for sensing when said lock yoke is in locking engagement with said gear shift lock; and
    an ancillary vehicle anti-theft device which is actuated by positioning of said lock yoke in locking engagement with said gear shift lock and is deactuated by removal of the yoke from locking engagement with the gear shift lock.

12. A vehicle anti-theft system according to claim 11 and wherein said gear shift lock comprises:
    a base member, a pair of bolts which are slideable with respect to said base member and a spring which is operative to urge the bolts into locking engagement with said base member and said lock yoke.

* * * * *